United States Patent [19]
Eisenmann et al.

[11] Patent Number: 6,046,593
[45] Date of Patent: Apr. 4, 2000

[54] METHOD/APPARATUS FOR MEASURING MUD RESISTIVITY USING A FOCUSED-ELECTRODE SYSTEM

[75] Inventors: Pierre Eisenmann; Jan W. Smits; Ollivier Faivre, all of Paris; Jean Claude Trouiller, Saint Remy Les Chevreuse, all of France

[73] Assignee: Schlumberger Technology Corporation, Ridgefield, Conn.

[21] Appl. No.: 08/733,583

[22] Filed: Oct. 18, 1996

[30] Foreign Application Priority Data

Oct. 20, 1995 [FR] France .................................. 95 12346

[51] Int. Cl.$^7$ ................ G01V 3/24; G01V 3/20
[52] U.S. Cl. ........................... 324/373; 324/324
[58] Field of Search ................... 324/373, 324, 324/354, 355, 366, 374, 375

[56] References Cited

U.S. PATENT DOCUMENTS

| 2,838,730 | 6/1958 | Leboury | 324/324 |
| 5,396,175 | 3/1995 | Seeman | 324/373 |

FOREIGN PATENT DOCUMENTS

1139369   1/1983   Canada ................................ 324/324

*Primary Examiner*—Walter E. Snow
*Attorney, Agent, or Firm*—William B. Batzer

[57] ABSTRACT

The invention relates to a method of measuring the resistivity of a drilling mud by means of a sonde provided with an annular current electrode ($A_0$) and with annular guard electrodes (A, A'), current $I_0$ being emitted into the surrounding formation together with focusing currents I and I'. A signal representative of $R_m$ is produced in response to $I_0$. Various apparatuses for implementing the method are described. Another method implements a technique of computed focusing. Corresponding apparatuses are also described.

22 Claims, 9 Drawing Sheets

METHOD/APPARATUS FOR MEASURING MUD RESISTIVITY USING A FOCUSED-ELECTRODE SYSTEM

BACKGROUND OF THE INVENTION

Technical Field and Prior Art

The present invention relates to the field of measurement tools, e.g., suitable for use in equipment for oil prospecting and production.

More specifically, after a well has been bored, that type of activity requires sondes or sensors, in particular electrical or electromagnetic sondes or sensors to be inserted into the hole to enable measurements to be performed serving to characterize, amongst others, which fluids are present in the terrain and layers around the borehole, and also the dip of said layers. The term "logging" is used to designate any continuous recording as a function of depth of variations in a given characteristic of the formations around a borehole.

One of the characteristics that it is important to know in a borehole is the resistivity of the drilling mud used. The resistivity of the mud is a parameter that is used, in particular, to correct measurements relating to other characteristics of the surrounding formations. In order to discover this mud resistivity, various approaches are already known.

In a first approach, mud resistivity is measured by a device that requires additional equipment on the tool already used for measuring the characteristics of the formation, which additional equipment may be, for example, of the AMS type (described in document EP-013 224). That technique gives rise to additional costs and to apparatus that is of greater bulk.

In another technique, the resistivity of the mud is measured at the surface from a fluid sample. Extrapolation then makes it possible to take account of temperature dependence relative to downhole conditions by measuring the temperature down hole. The accuracy obtained is often unsatisfactory, essentially for the following two reasons:

difficultly in obtaining an accurate measurement of the temperature downhole; and the characteristics of the fluid in the borehole can change with depth, in which case the sample available on the surface is no longer representative.

SUMMARY OF THE INVENTION

An object of the invention is to provide a novel method and novel apparatus enabling a measurement to be obtained of the resistivity of the mud in a borehole, without requiring additional specific apparatus to be implemented, but capable of making use of electrode structures that already exist. In addition, the new method and the new apparatus must be capable of measuring the resistivity of the mud in situ, without it being necessary to take samples for subsequent analysis on the surface. Finally, it is desirable to find a method and an apparatus that enable measurements to be made on the mud without requiring any prior measurement of the azimuth resistivity of the surrounding formations, and which is relatively insensitive to the influence of the diameter of the borehole.

In a first aspect of the invention, the invention provides a method of measuring the resistivity $R_m$ of a drilling mud inside a borehole passing through a terrestrial formation, the method comprising:

inserting a sonde into the borehole, the sonde having an elongate body provided with at least one annular current electrode and at least two annular guard electrodes situated on either side of the annular current electrode;

emitting at least one current $I_0$ into the surrounding formation from the annular current electrode;

focusing the current $I_0$ in the formation by emitting two currents $I_1$ and $I'_1$ from the annular guard electrodes situated on either side of the annular current electrode; and producing a signal in response to the emitted current $I_0$, which signal is representative of the resistivity $R_m$ of the drilling mud.

This method is a method of measuring the resistivity of the mud in situ. It does not require any prior knowledge of the azimuth resistivity of the surrounding formations. In addition, it is relatively insensitive to the effects due to variations in the dimensions of the borehole, particularly when the borehole diameter is relatively large. Finally, it should be observed that mud resistivity is measured by emitting current into the surrounding formation, and not by emitting surface current into the mud.

A signal may be produced that is representative of a voltage induced through the borehole mud by the current $I_0$ circulating through said mud and the formation.

The sonde may include a single annular current electrode, first and second pairs of annular electrodes referred to as electrodes for measuring voltage in the borehole mud, each pair being disposed on either side of the annular current electrode, the resistivity $R_m$ being deduced from the ratio $(V_1-V_3)/I_0$ in which $V_1$ and $V_3$ are the mean potentials of the two pairs of electrodes for measuring voltage in the drilling mud.

In another embodiment, the sonde may include:

two annular current electrodes respectively emitting a current $I_0$ and a current $I'_0$ into the surrounding formation; and an annular potential-measuring electrode situated between the two current electrodes or else an array of azimuth electrodes situated between the two annular current electrodes.

This embodiment is particularly well adapted to enabling the method to be implemented using electrode structures that already exist.

The invention also provides an apparatus for measuring the resistivity of drilling mud in a borehole passing through a terrestrial formation, the apparatus comprising:

a sonde having an elongate body provided with at least one annular current electrode and at least two annular guard electrodes situated on either side of the annular current electrode;

means for emitting at least one current $I_0$ into the surrounding formation from the annular current electrode;

means for focusing the current $I_0$ in the formation by emitting two currents $I_1$ and $I'1$ from the two annular guard electrodes situated on either side of the annular current electrode; and means for producing a signal in response to the emission of the current $I_0$, said signal being representative of the resistivity $R_m$ of the drilling mud.

This apparatus is associated with the same advantages as those specified above with reference to the first method of measurement of the invention: it enables measurements to be performed in situ, and it does not require prior knowledge of azimuth resistivities.

The apparatus may include means for producing a signal representative of a voltage induced through a drilling mud by the current $I_0$, because of the current flowing through the mud and through the formation.

Thus, the sonde may include a single annular current electrode, first and second pairs of annular electrodes for measuring voltage in the drilling mud, each pair being disposed on either side of the annular current electrode, the means for producing a signal representative of the resistivity $R_m$ enabling $R_m$ to be deduced from the ratio $(V_1-V_3)/I_0$, where $V_1$ and $V_3$ are the mean potentials of the two pairs of electrodes for measuring voltage in the drilling mud.

In another aspect, the same apparatus may be such that the sonde includes:

two annular current electrodes;

means for emitting into a surrounding formation a current $I_0$ via one of the annular electrodes, and a current $I'_0$ via the other annular electrode;

an annular electrode for measuring potential, situated between the two current electrodes, or else an array of azimuth electrodes situated between the two annular current electrodes.

The tools of the prior art, and those described above, require the current $I_0$ or the current $I_0$ and $I'_0$ as emitted from the annular current electrode(s) into the terrestrial formation to be focused. Means must therefore be implemented for providing such focusing. In general, this requires a feedback loop to enable the focusing current(s) to be adjusted as a function, for example, of a signal representative of a focusing potential. In theory this implies amplification with infinite gain, but in practice gain must be limited in order to ensure stability. In particular, when using focusing potential measurement electrodes, as is usually the case, the result is that these electrodes are not at exactly the same potential and this gives rise to a measurement error. Although the error is very small, particularly in standard "Dual Laterolog" type tools, it can become large when the spacing between the focusing voltage measurement electrodes is reduced in order to improve the resolution of the apparatus.

Consequently, it is desirable to be able to propose a method and apparatus for measuring the resistivity of drilling mud that enable the objects already specified above to be achieved while also making it possible to eliminate errors due to the presence of a feedback loop.

The invention thus also provides a method of measuring the resistivity of drilling mud in a borehole passing through a terrestrial formation, the method comprising:

inserting a sonde into the borehole, the sonde having an elongate body provided with at least one annular current electrode and at least two annular guard electrodes situated on either side of the annular current electrode;

performing computed focusing to simulate an operating mode in which:

at least one current $I_0$ is emitted into the surrounding formation from the annular current electrode;

the current $I_0$ is focused in the formation by emitting two currents $I_1$ and $I'_1$ from the two annular guard electrodes situated on either side of the annular current electrode;

producing a signal representative of the resistivity $R_m$ of the drilling mud from the simulated operating mode.

This method does not require any direct focusing to be implemented, and it makes use only of focusing by computation. Since the stimulation is generally performed by computer apparatuses on the surface, the measurement tool as used is considerably simplified. Also, insofar as no direct focusing takes place during measurement, the means for controlling and/or regulating the focusing current are not implemented. This avoids all of the focusing current feedback loops.

In addition, this method does not require prior knowledge of the azimuth resistivity of the surrounding formations. It is less sensitive than prior art methods to effects due to variations in the dimensions of the borehole.

In a particular implementation, the computed focusing may be performed on the basis of two real or "effective" operating modes of the sonde:

a first mode in which current having great penetration depth is emitted into the surrounding formations; and a second mode in which current having shallow penetration depth is emitted into the surrounding formations.

In the first mode, the currents of greater penetration depth subsequently return to the surface. In contrast, in the second mode, the currents do not penetrate very far into the surrounding formations.

The computed focusing may be implemented on the basis of the two following modes:

a first operating mode in which current is emitted into the surrounding formation, specifically a current $i_1$ from one of the annular guard electrodes and a current $i'_1$ from the other annular guard electrode, the current emitted by the annular current electrode(s) being equal to 0;

a second operating mode in which at least one current $i_0$ is emitted from the annular current electrode(s) to the annular guard electrodes, with the total current emitted from the sonde into the formation being equal to 0.

In each mode, signals may be produced that are representative of a "focusing" voltage and of a "sonde" voltage; in addition, in the second mode, a signal may be produced that is representative of the current emitted from the current electrode(s).

In one computation technique, it is possible to deduce a weighting coefficient from a linear combination of the two effective operating modes of the sonde so as to obtain a computed mode for which the resultant focusing voltage is zero.

In another computation technique, a signal is also produced in the first mode that is representative of the total current emitted into the formation, and transfer impedances or coefficients are calculated between:

firstly the focusing voltage and the sonde voltage; and secondly the current emitted from the current electrode(s) and the total current emitted into the formation.

The measured value of $R_m$ may then be deduced from the ratio of the sonde voltage value divided by the current value emitted from the current electrode(s), for which values the focusing voltage is zero.

The sonde may comprise:

a single current electrode;

first, second, and third pairs of potential-measuring electrodes disposed on either side of the current electrode;

the focusing voltage being equal to the difference $V_1-V_2$ between the mean voltages from the first and second pairs of potential-measuring electrodes;

the sonde voltage being equal to the difference $V_2-V_3$ between the mean voltages from the second and third pairs of potential-measuring electrodes.

In a variant, the sonde may comprise:

two annular current electrodes;

and:

either an annular potential electrode disposed between the two current electrodes;

or else an array of azimuth electrodes disposed between the two current electrodes;

and first and second pairs of annular potential-measuring electrodes;

the focusing voltage being equal to the difference between the mean voltage of the first pair of annular potential-measuring electrodes and either the voltage of the annular potential electrode disposed between the two current electrodes, or the mean voltage of the array of azimuth electrodes;

the sonde voltage being equal to the difference between the mean voltages of the first and second pairs of annular potential-measuring electrodes.

The invention also provides an apparatus for measuring the resistivity of drilling mud in a borehole passing through a terrestrial formation, the apparatus comprising:

a sonde having an elongate body provided with at least one annular current electrode and at least two annular guard electrodes situated on either side of the annular current electrode;

means for performing computed focusing so as to simulate an operating mode in which:

at least one current $I_0$ is emitted into the surrounding formation from the annular current electrode;

the current $I_0$ is focused in the formation by emitting two currents $I_1$ and $I'_1$ from the annular guard electrodes situated on either side of the annular current electrode;

means for computing a signal representative of the resistivity $R_m$ of the drilling mud on the basis of the simulated operating mode.

This apparatus does not require means to be implemented for providing effective control of focusing current. It therefore avoids any feedback loop. In addition, it makes it possible to implement the above-described method, with all of the corresponding advantages.

The sonde may also include means for use in a first effective operating mode to emit currents of great penetration depth into the surrounding formations, and in a second effective operation mode for emitting currents of small penetration depth into the surrounding formations, with the means for performing computed focusing performing the focusing on the basis of these two effective modes of operation.

Thus, the sonde may comprise:

means for emitting into the surrounding formation in a first effective operating mode both a current $i_1$ from one of the annular guard electrodes and a current $i'_1$ from the other annular guard electrode, the current emitted from the annular current electrode(s) being equal to 0;

means for emitting, in a second effective operating mode, at least one current $i_0$ from the annular current electrode (s) to the annular guard electrodes, the total current emitted from the sonde into the formation being equal to 0;

the means for performing computed focusing operating on the basis of these two effective operating modes.

Means may be provided to produce:

signals representative of a focusing voltage and of a sonde voltage;

a signal representative of the current(s) emitted from the current electrode(s).

In order to implement a first computation technique, in a first embodiment, the means for performing computed focusing enable a weighting coefficient to be deduced from a linear combination of the two effective operating modes of the sonde, and to obtain a computed mode for which the resultant focusing voltage is zero.

In order to implement another computation technique, in another embodiment, means may be provided for use in the first effective operating mode to produce a signal representative of the total current emitted into the formation, the means for performing computed focusing serving to deduce transfer impedances or coefficients between:

means being provided for producing in the first effective operating mode, a signal representative of the total current emitted into the formation;

the means for performing computed focusing enabling transfer impedances or coefficients to be deduced between:
firstly the focusing voltage and the sonde voltage; and
secondly the current emitted from the current electrode (s) and the total current emitted into the formation.

The means for computing a signal representative of the resistivity $R_m$ may be suitable for deducing $R_m$ from the ratio of the sonde voltage value divided by the value of the current emitted from the current electrode(s), for which values the focusing voltage is zero.

The methods described above may also include a step of correcting the measured values $R_m$ to take account of the following sources of error:

the highly resistive nature of the surrounding formation;

the presence of one or more highly conductive beds in the formation;

the influence of the borehole.

These corrections may, for example, be implemented by means of an extended Kalman filter.

The corresponding apparatuses may include corresponding means for implementing the corrections.

BRIEF DESCRIPTION OF THE DRAWINGS

In any event, the characteristics and advantages of the invention appear more clearly in the light of the following description. The description relates to embodiments given in non-limiting manner for explanatory purposes, and it refers to the accompanying drawings, in which.

DETAILED DESCRIPTION OF EMBODIMENTS OF THE INVENTION

Figure 1:
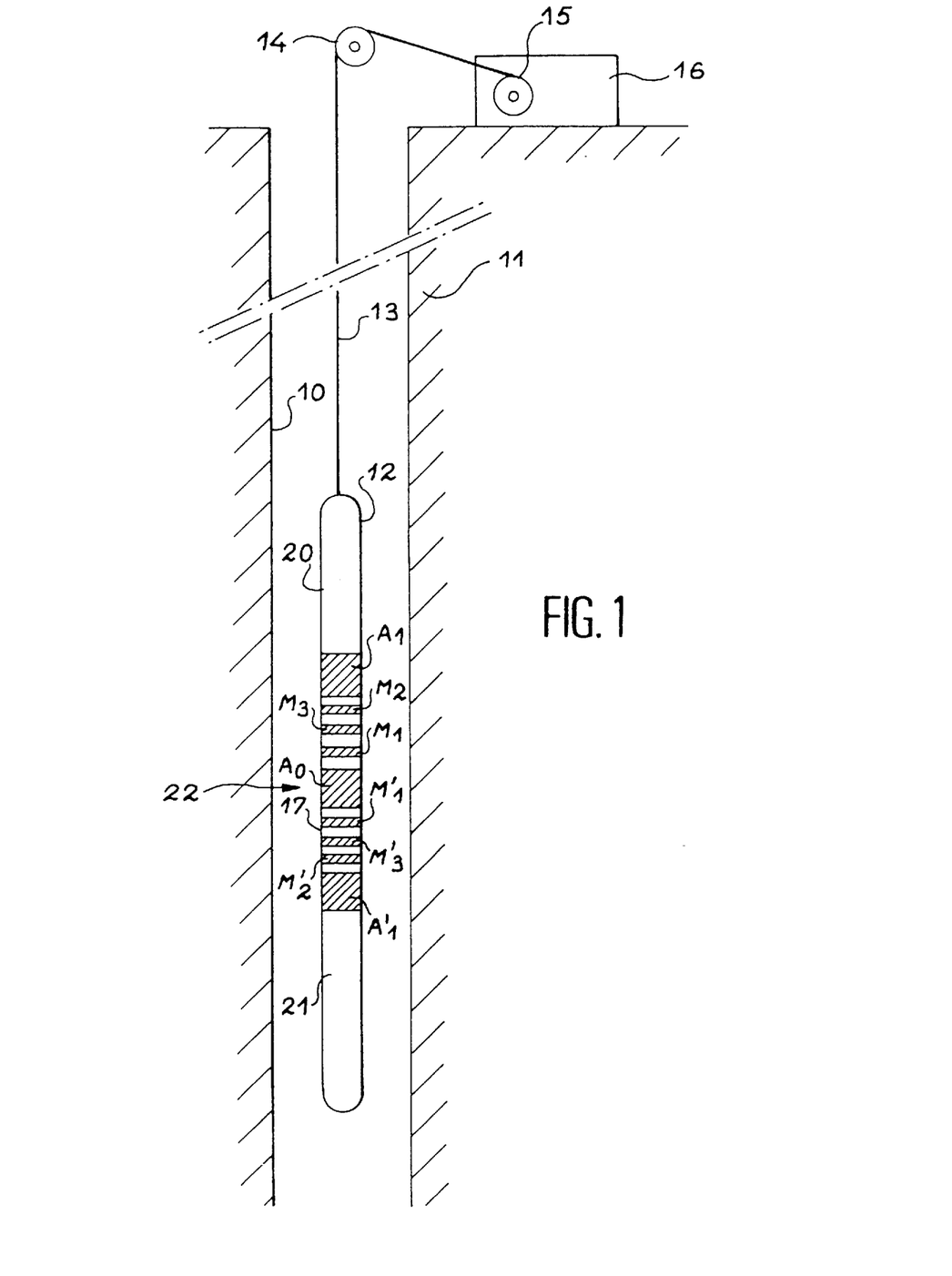
FIG. 1 shows logging apparatus including a sonde on which electrodes are disposed for measuring the resistivity of drilling mud in accordance with the invention.

Overall implementation of the invention is initially shown diagrammatically in FIG. 1 where there can be seen logging apparatus enabling the characteristics of terrestrial formations 11 surrounding a well or borehole 10 to be determined. The apparatus comprises a sonde 12 which is suspended down the borehole at the end of a multiconductor cable 13. The cable 13 passes over a sheath 14 and is wound on a drum 15 which serves to move the sonde 12 along the borehole. The drum 15 forms part of a surface unit 16 which may also include means for computer processing data measured by the sonde while it is being displaced in the borehole.

The sonde 12 is elongate in shape. It comprises a body 17 having a top portion 20 made of a metal case enclosing electrical circuits, and a bottom portion 21 in which devices for measuring the formations 11 may be included. In addition, the section 21 has an array 22 of electrodes making it possible, in particular, to determine the resistivity of the drilling mud.

One such array 22 of electrodes is described below in the context of a first embodiment and with reference to FIG. 2A.

This figure is a diagrammatic representation of the array of electrodes on its own, i.e. without the body of the sonde. First, second and third pairs of annular potential-measuring electrodes ($M_1$, $M'_1$; $M_2$, $M'_2$; $M_3$, $M'_3$) are disposed on either side of a central annular electrode $A_0$, also referred to as a "current" electrode. The electrode $M_3$ is disposed between $M_1$ and $M_2$ (and likewise $M'_3$ between $M'_1$ and $M'_2$). On either side of this assembly, there are disposed two annular electrodes A and A', also referred to as "guard" electrodes. A current $I_0$ is emitted by the electrode $A_0$, which current passes through the drilling mud and then the terrestrial formations, after which it returns to the surface. Currents I and I' are emitted into the same formations from the guard electrodes A and A'. These currents are also referred to as "focusing" currents: they serve to keep the current $I_0$ in a narrow slice of ground perpendicular to the axis of the apparatus. In order to be able to maintain the magnitudes of the currents I and I' at values that enable good focusing to be ensured, the annular potential-measuring electrodes serve to obtain a signal representative of a focusing potential; this applies in particular to electrode pairs $M_1$ $M'_1$ and $M_2$, $M'_2$: the mean voltage $V_1$ of electrode pair $M_1$, $M'_1$ and the mean voltage $V_2$ of electrode pair $M_2$, $M'_2$ are both measured, or else a signal or signals representative of these voltages are produced. The condition for focusing is then written: $V_1=V_2$. The currents I and I' are adjusted so as to ensure that this condition is satisfied. An electrical circuit for adjusting the currents I and I' as a function of this condition is described below.

Also, although the current $I_0$ is emitted perpendicularly to the sonde into the drilling mud and towards the formation, it nevertheless induces voltages in the drilling mud. Such voltages can be measured; in particular, a signal representative of an induced voltage may be produced, e.g. by measuring the mean voltage of a pair of annular electrodes, such as the pair $M_3$, $M'_3$, and by comparing said mean voltage with the mean voltage $V_1$. More precisely, the resistivity of the mud $R_m$ is written:

$$R_m = K \frac{V_1 - V_3}{I_0}$$

where K is a factor that depends on the geometry of the sonde.

Because of the focusing, the path of the current $I_0$ in the column of mud is stable and independent of the resistivity of the formation located beyond the column of mud, providing the hole is not too small.

With the method of the invention, the current $I_0$ is sent into the terrestrial formation, and it is with this current that $R_m$ is measured and not with a superficial current, i.e. a current flowing essentially in the drilling mud.

Figure 2A:
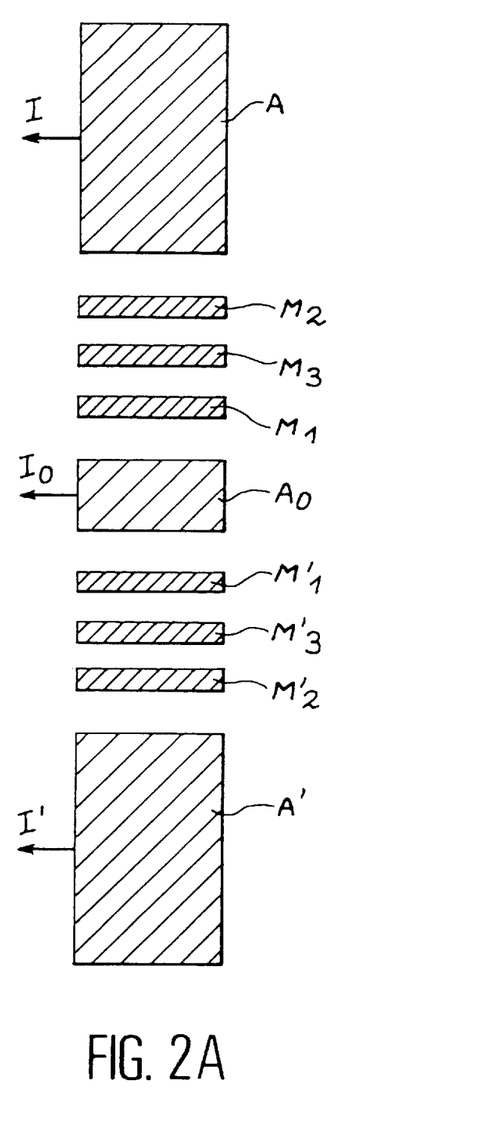
FIGS. 2A and 2B show respectively a first embodiment of apparatus of the present invention, and a variant of the first embodiment, in a borehole.
Figure 2B:
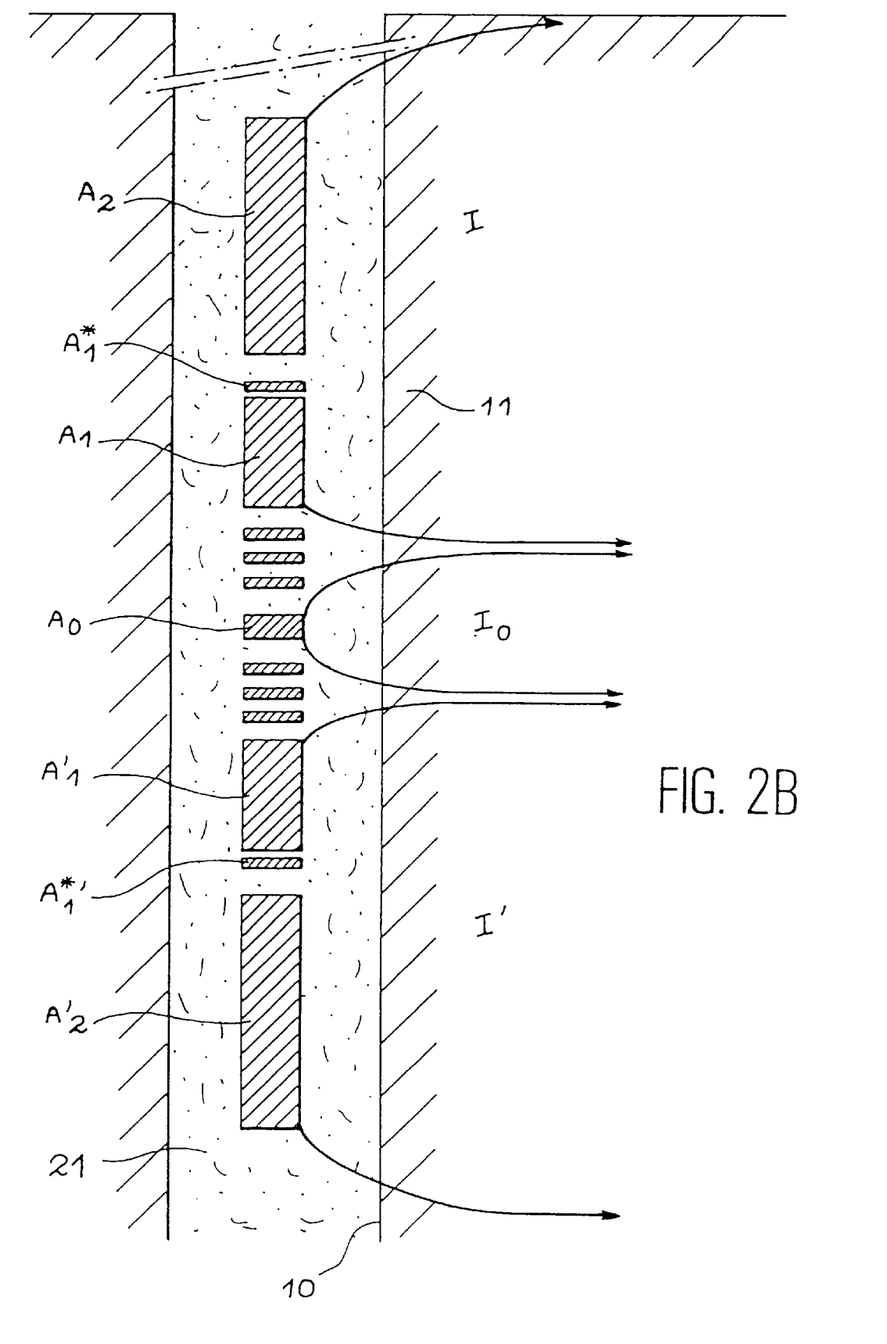

In a variant, which makes it possible for a sonde used in apparatus of the invention to be made compatible with sondes used for other measurements, the guard electrodes A and A' may be split into two portions $A_1$, $A_2$ (for electrode A) and $A'_1$, $A'_2$ (for electrode A'), as shown in FIG. 2B. It is convenient to add an annular potential-measuring electrode $A_1^*$ adjacent to the electrode $A_1$ (and $A_1^{*'}$ adjacent to $A'_1$). The focusing current I is then emitted by the electrodes $A_1$ and $A_2$ which are maintained at the same potential (and likewise I' by $A'_1$ and $A'_2$). The other electrodes (the annular potential-measuring electrodes and the central current electrode $A_0$) of the electrode structure in FIG. 2B are identical to those of FIG. 2A. FIG. 2B also shows, diagrammatically, the relative disposition of the set of electrodes, the borehole 10, and the formation 11. The figure also shows current lines for the current $I_0$ and the focusing currents I and I'. In the figure, it can be seen clearly that the current $I_0$ remains, over a certain distance, within a slice perpendicular to the axis of the hole 10. At infinity, the current $I_0$ returns to the surface. The current lines obtained would be substantially the same with electrodes organized as shown in FIG. 2A, where the guard electrodes are not split in two.

Another arrangement of electrodes for a sonde for use in apparatus of the invention is now described with reference to FIG. 3. This structure makes use of two annular current electrodes $A_0$ and $A'_0$. On either side of this assembly there are two pairs of annular potential-measuring electrodes $M_1$, $M'_1$ and $M_3$, $M'_3$. Between the two annular current electrodes $A_0$ and $A'_0$, there is an annular potential-measuring electrode $M_0$. At the ends, on either side of the above assembly, there are two guard electrodes A and A'. An investigation current $I_0$ is emitted by annular current electrode $A_0$ (and $I'_0$ by $A'_0$). The guard electrodes emit focusing currents I and I'. Here again, the currents $I_0$ and $I'_0$ are emitted towards the formation, pass through it, and return to the earth's surface at infinity. Because they have passed through the drilling mud, they establish voltages therein, and a voltage in the drilling mud can be measured, e.g. between electrode pairs $M_1$, $M'_1$ and $M_3$, $M'_3$. The resistivity of the mud is then obtained by the formula:

$$R_m = K' \frac{V_1 - V_3}{I_0 + I'_0}$$

where $V_1$ designates the mean potential of electrode pair $M_1$, $M'_1$ (and $V_3$ of pair $M_3$, $M'_3$). The condition for proper focusing of the currents $I_0$ and $I'_0$ by the currents I and I' is written:

$$V_1=V_0$$

where $V_1$ has the same meaning as above and $V_0$ is the potential of the electrode $M_0$.

For the same reasons as those already given above (compatibility with electrode structures used for other measurements) the guard electrodes may be split in two in this case also, in the manner explained with reference to FIG. 2B.

Another embodiment of an electrode structure suitable for use in apparatus for implementing the invention is described below with reference to FIG. 4. In this figure, elements that are identical to or that correspond to items described above with reference to FIG. 3 are given the same references. Compared with the FIG. 3 structure, the electrodes $M_3$, $M'_3$ have been omitted. Instead, an annular potential-measuring electrode $A_0^*$ is disposed in the middle of current electrode $A_0$, i.e. one portion of $A_0$ extends above an annular potential-measuring electrode $A_0^*$ while another portion of the same electrode $A_0$ extends below $A_0^*$. The same disposition is adopted for $A'_0$ and an electrode $A_0^{*'}$, which electrode likewise acts as an annular potential-measuring electrode. Investigation currents $I_0$ and $I'_0$ are emitted through the drilling mud towards the formation. They are focused by the currents I and I', in the same manner as for the electrode structure described above with reference to FIG. 3. The resistivity of the drilling mud is measured in application of the formula:

$$R_m = K_1 \frac{V_0^* - V_0}{I_0 + I'_0}$$

where $V_0^*$ designates the mean potential of the electrodes $A_0^*$ and $A_0^{*'}$. The condition for focusing is written: $V_1 = V_0$, where $V_1$ and $V_0$ have the same meanings as given above.

Figure 3:
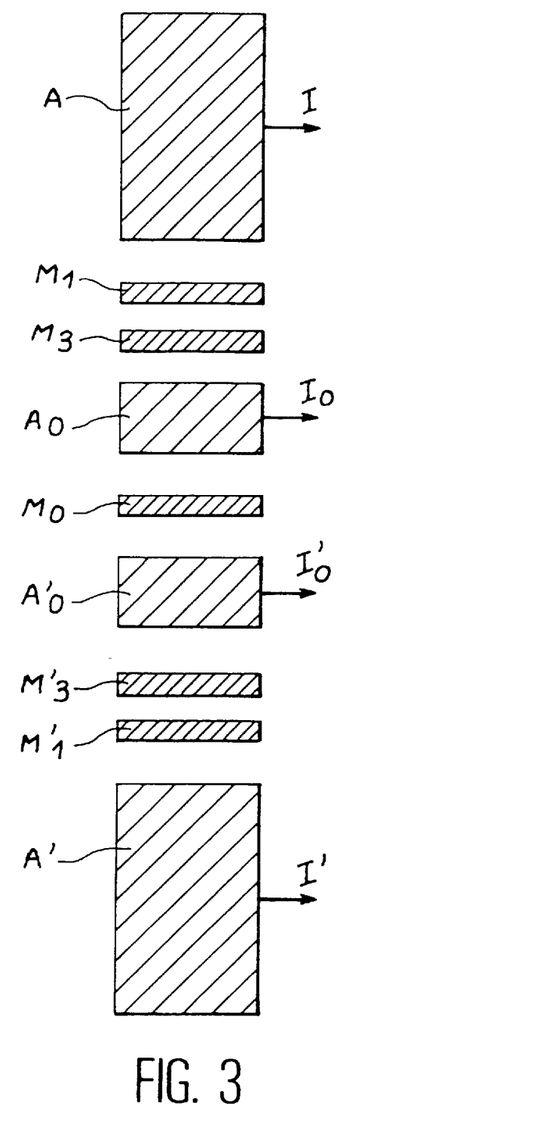
FIG. 3 shows a second embodiment of apparatus of the present invention.
Figure 4:
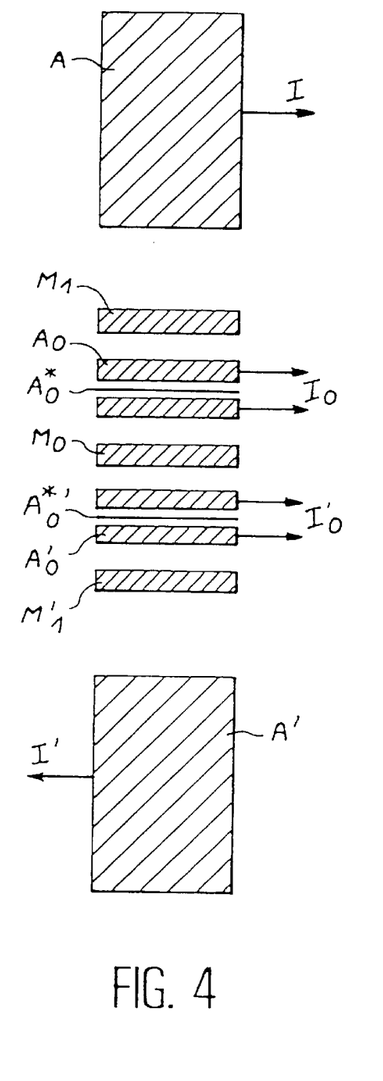
FIG. 4 shows a third embodiment of apparatus of the present invention.

In principle, the apparatus of FIG. 4 operates in the same manner as that of FIG. 3. Inserting a potential-measuring electrode between two portions of a current electrode makes it possible to improve certain measurements when contact impedance variations occur at the surface of electrode $A_0$ or $A'_0$.

In a variant of this embodiment, it is possible to place the pair of annular potential-measuring electrodes $A_0^*$ and $A_0^{*'}$ between the corresponding current electrodes $A_0$, $A'_0$ and the annular potential-measuring electrode $M_0$. The formulas given above in the description of FIG. 4 apply in this case also.

Figure 5A:
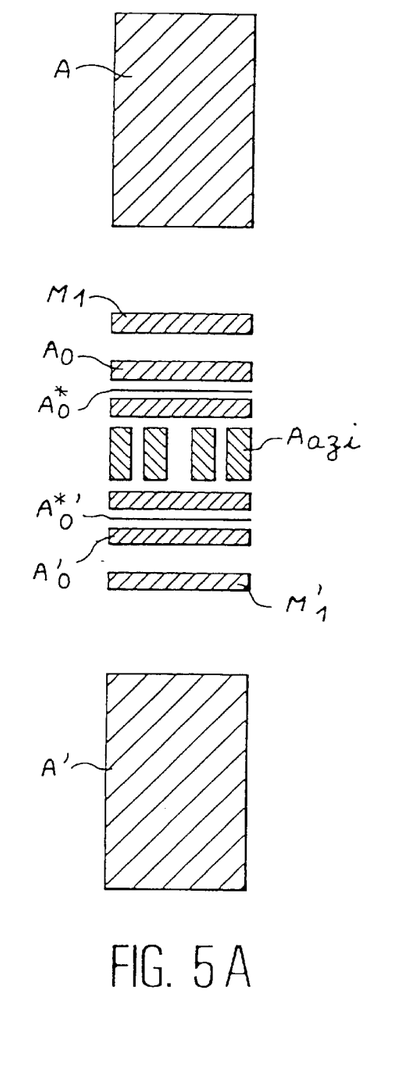
FIGS. 5A and 5B show respectively a fourth embodiment of apparatus of the present invention and a variant of said fourth embodiment in a borehole.

Another embodiment of an electrode structure that can be implemented in the context of the present invention is shown in FIG. 5A. This structure is derived from the structure of FIG. 4 by replacing the central annular voltage-measuring electrode $M_0$ by an array of N azimuth electrodes $A_{azi}$. Here again, the resulting structure is compatible with electrode structures otherwise used for other measurements. An array of azimuth electrodes is used, in particular, for performing measurements in different directions around the sonde, in particular measurements of azimuth resistivity. Investigation currents $I_0$ and $I'_0$ are emitted by the annular electrodes $A_0$ and $A'_0$ and they are focused by currents $I_0$ and $I'_0$ respectively emitted by electrodes $A_0$ and $A'_0$. The envelope of current lines is represented diagrammatically in FIG. 5B for an electrode structure that corresponds essentially to that of FIG. 5A. A difference lies in the guard electrodes being spilt into two portions as explained above with reference to FIG. 2B, thereby obtaining the same advantages. References identical to those used in that figure designate the same elements in the present figure.

The resistivity of the mud is then given by:

$$R_m = K'_1 \frac{V_0^* - V_{zi}}{I_0 + I'_0}$$

where $V_0^*$ represents the mean potential of the electrodes $A_0^*$ and $A_0^{*'}$, while $V_{zi}$ represents the mean potential of the array of azimuth electrodes. Also, the condition for focusing is written: $V_1 = V_{zi}$, where $V_1$ represents the mean potential of the electrodes $M_1$ and $M'_1$.

Figure 6A:
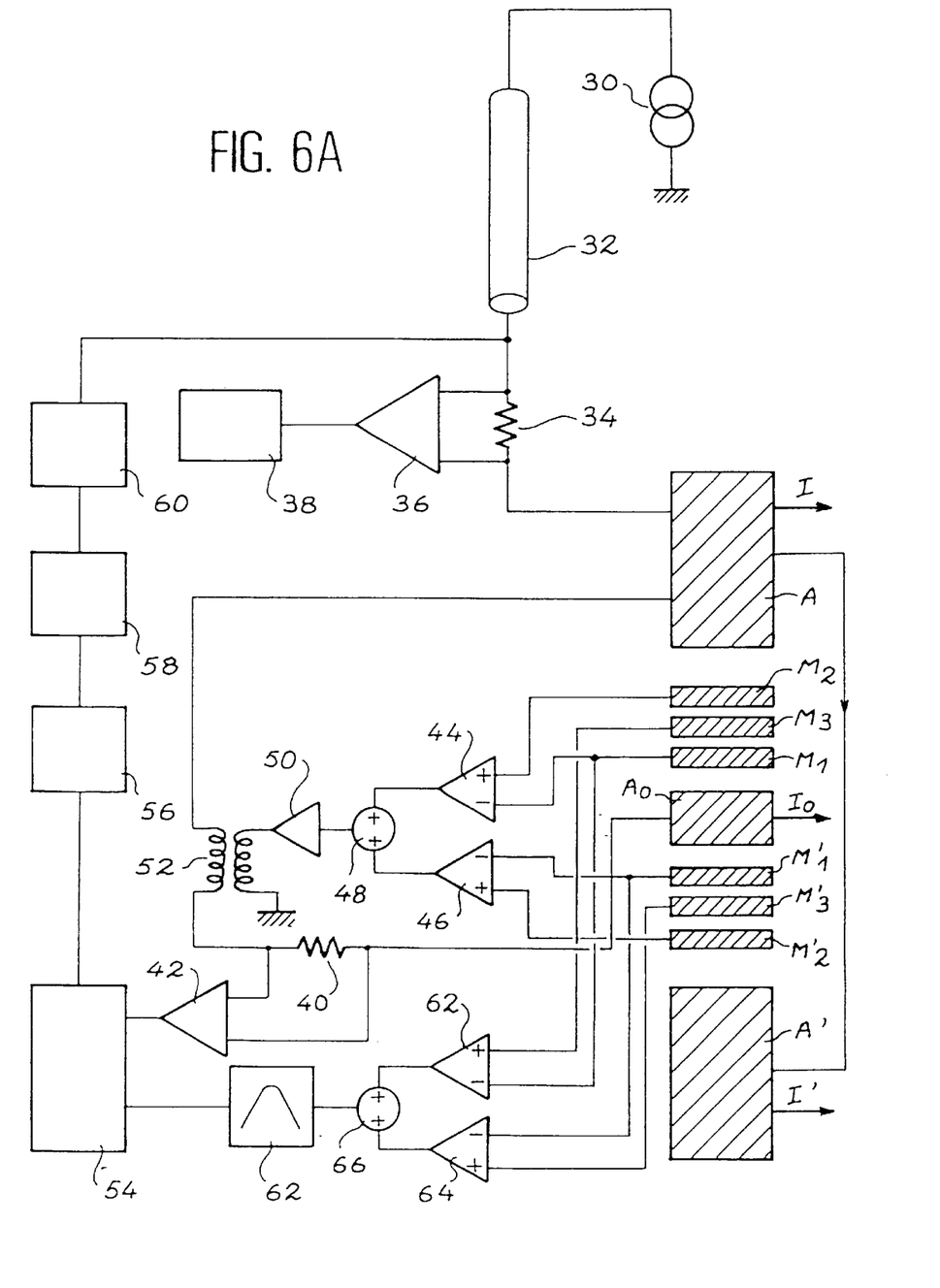
FIGS. 6A and 6B are electrical circuit diagrams for implementing a method and apparatus of the invention for direct focusing.

FIG. 6A is an electrical circuit diagram for use with an electrode structure of the invention, for the particular case of the structure shown in FIG. 2A. A generator 30, e.g. situated on the surface, delivers a current which is transmitted via a cable 32 to the electrodes A and A' each of which emits a focusing current, and to the electrode $A_0$ which emits an investigation current $I_0$. Means may be provided for measuring the total generated current, e.g. by placing a resistor 34 so that voltage can be taken from across its terminals and applied to a differential amplifier 36 and to current calculating means 38, for example. Means are also provided for measuring the current $I_0$, for example voltages are taken from the terminals of a resistor 40 and are applied to a differential amplifier 42. The focusing voltage control loop (between electrode pairs $M_1$, $M'_1$ and $M_2$, $M'_2$) serves to take the voltages from the terminals of the electrodes to measure the focusing potential, which voltages are transmitted to differential amplifiers 44 and 46 whose outputs are connected to the inputs of a summing circuit 48. The output of the summing circuit is amplified (amplifier 50) and, if there is unbalance relative to the focusing condition (which condition is written $V_1 = V_2$), a non-zero signal is delivered to a transformer 52 which then controls a different distribution of currents amongst the annular guard and current electrodes. The measured current $I_0$ is transmitted from the output of amplifier 42 to a multiplexer 54 which is followed by an analog-to-digital converter 56, a digital processor 58, and a telemetry emitter 60. The signal is then transmitted to the surface via the cable 32.

The measurement signal is obtained from signals taken from the terminals of electrodes pairs $M_1$, $M'_1$ and $M_3$, $M'_3$, which signals are transmitted to differential amplifiers 62 and 64 whose outputs are delivered to a summing circuit 66. The resulting signal is filtered by a bandpass filter 68 and is transmitted to the multiplexer 54 which is followed by the above-described elements 56, 58, and 60. The resulting signal is transmitted to the surface.

Figure 6B:
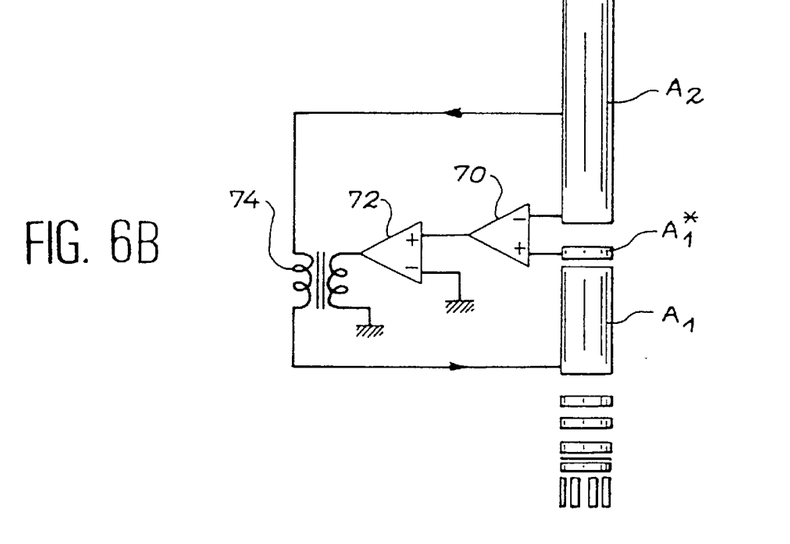

An electrical circuit diagram for ensuring equal potentials on electrodes $A_1$ and $A_2$ of FIG. 2B, for example, is given in FIG. 6B. In this figure, only the top portion of the sonde above electrode $A_0$ is shown. An electrode $A_1^*$ is associated with electrode $A_1$ so as to make it possible to measure the potential of $A_1$. An amplifier 70 delivers a signal proportional to the voltage measured between electrode $A_2$ and electrode $A_1^*$. A differential amplifier 72 compares the resulting signal with ground potential. If there is unbalance between the voltages of electrodes $A_2$ and $A_1^*$, then amplifier 72 delivers a non-zero signal to a transformer 74 which then controls a different distribution of currents between electrodes $A_1$ and $A_2$. The same circuit can be applied to electrodes $A'_1$ and $A'_2$, electrode $A'_1$ being associated with a potential-measuring electrode $A_1^{*'}$. All of the elements 70 to 76 may be integrated in the body of the sonde lowered down the borehole.

The tools or electrode arrangements for a sonde as described above are for implementing a method that makes use of direct or effective focusing of the investigation current in the surrounding formations. It is also possible to perform computed focusing, i.e. focusing that is simulated on the basis of effective modes that do not make use of direct focusing. All of the electrode arrangements that have been described above can be used to implement computed focusing, the overall apparatus including means specific to implementing such computed focusing.

Figures 7A, 7C:
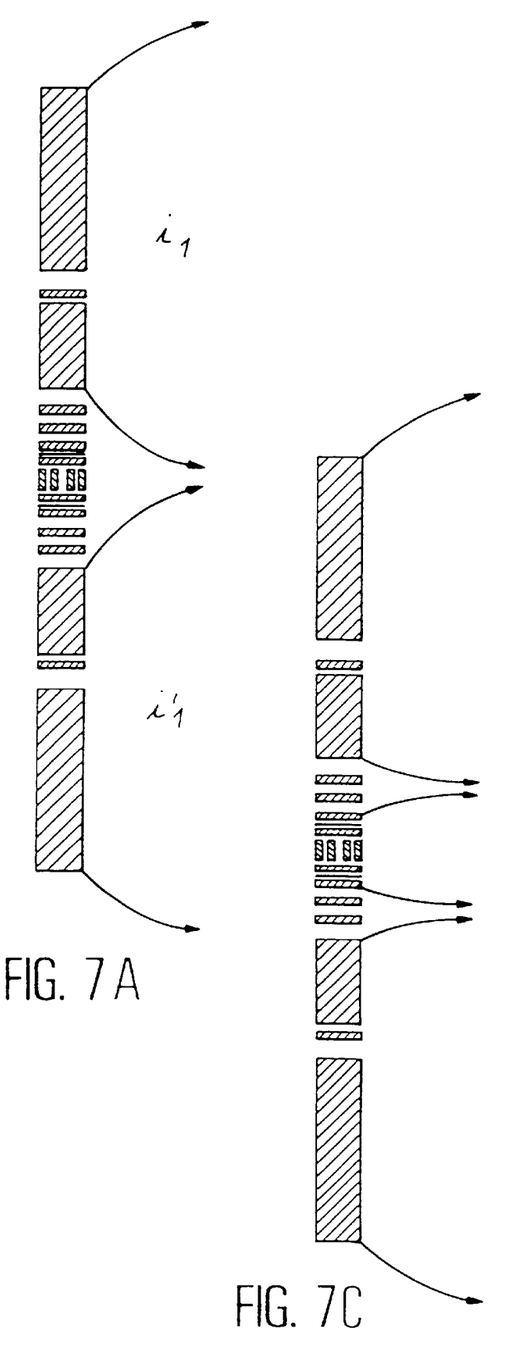
FIGS. 7A to 7C are diagrams showing effective operating modes that can be used when implementing a method of the present invention that makes use of computed focusing, and also showing the mode that results from combining the two effective modes.
Figure 7B:
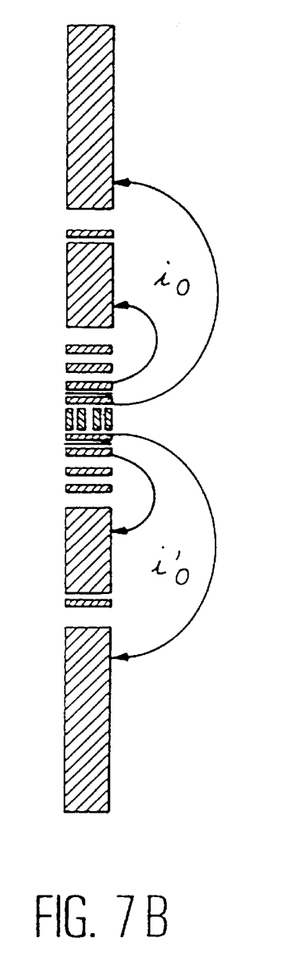

The principle of computed focusing in the particular case of measuring mud resistivity is described briefly with reference to FIGS. 7A to 7C. In these figures, the arrangement of electrodes taken into consideration is identical to that described above with reference to FIG. 5B, however this is not limiting.

The sonde enables two effective modes of operation to be performed:

- a first mode (FIG. 7A) in which currents are emitted that have considerable penetration depth into the surrounding formations; for example, a current $i_1$ is emitted into the formations from a first set of annular guard electrodes, and a current $i'_1$ is emitted from the other set of annular guard electrodes, with the current emitted by the annular current electrodes being equal to 0; and
- a second mode (FIG. 7B) in which currents are emitted that have shallow penetration depth into the surrounding formations; for example, currents $i_0$ and $i'_0$ are emitted from the annular current electrodes to the annular guard electrodes, with the total current emitted from the sonde into the formation being equal to 0.

Both of the above modes may be implemented simultaneously but at different frequencies, with the first mode being implemented at 35 Hz, for example, while the second mode is implemented at about 162 Hz. If the selected frequencies are equal or close together, then the two effective modes of operation need to be implemented successively.

While operating in these modes, signals representative of a focusing voltage and signals representative of a sonde voltage may be taken and measured. A signal representative of the resistivity $R_m$ of the drilling mud is deduced by simulation after reconstruction of a focused mode of operation.

Thus, it is possible to compute which respective weights should be given to the two effective operating modes so that a linear combination thereof provides an operating mode in which the condition for focusing is satisfied. Such a mode is shown in FIG. 7C: it can be seen that the same current lines are associated therewith as when effectively operating with direct focusing, as shown in FIG. 2B.

In a variant, it is possible to use the data measured during the effective operating modes to compute transfer impedances which enable the investigation currents and the total currents emitted into the formation to be associated with a focusing potential and with a sonde potential. After these transfer impedances have been computed, it is possible to deduce therefrom voltage values for the sonde and investigation current values for which a focusing condition is satisfied.

In general, it is considered that an operating mode, whether effective or simulated, is completely described by the data of the investigation current(s), the total current emitted in the formation, a focusing voltage, and a sonde voltage. When the annular guard electrodes are split into two portions (as shown in FIGS. 7A to 7C), the value of the voltage difference between electrodes $A_1$ and $A_2$, and also between electrodes $A'_1$ and $A'_2$ does not have any effect since this voltage difference is kept at zero.

In the structure of FIG. 2A, the focusing voltage may be given by the difference $V_2-V_1$, whereas the probe voltage is given by the difference $V_3-V_1$.

In the structure of FIG. 3, the focusing voltage is the voltage $V_1-V_0$, an the tool voltage is the difference $V_3-V_1$.

In the structure shown in FIG. 4, the focusing voltage is equal to $V_1-V_0$, while the sonde voltage is equal to $V_1-V_0^*$.

Figure 5B:
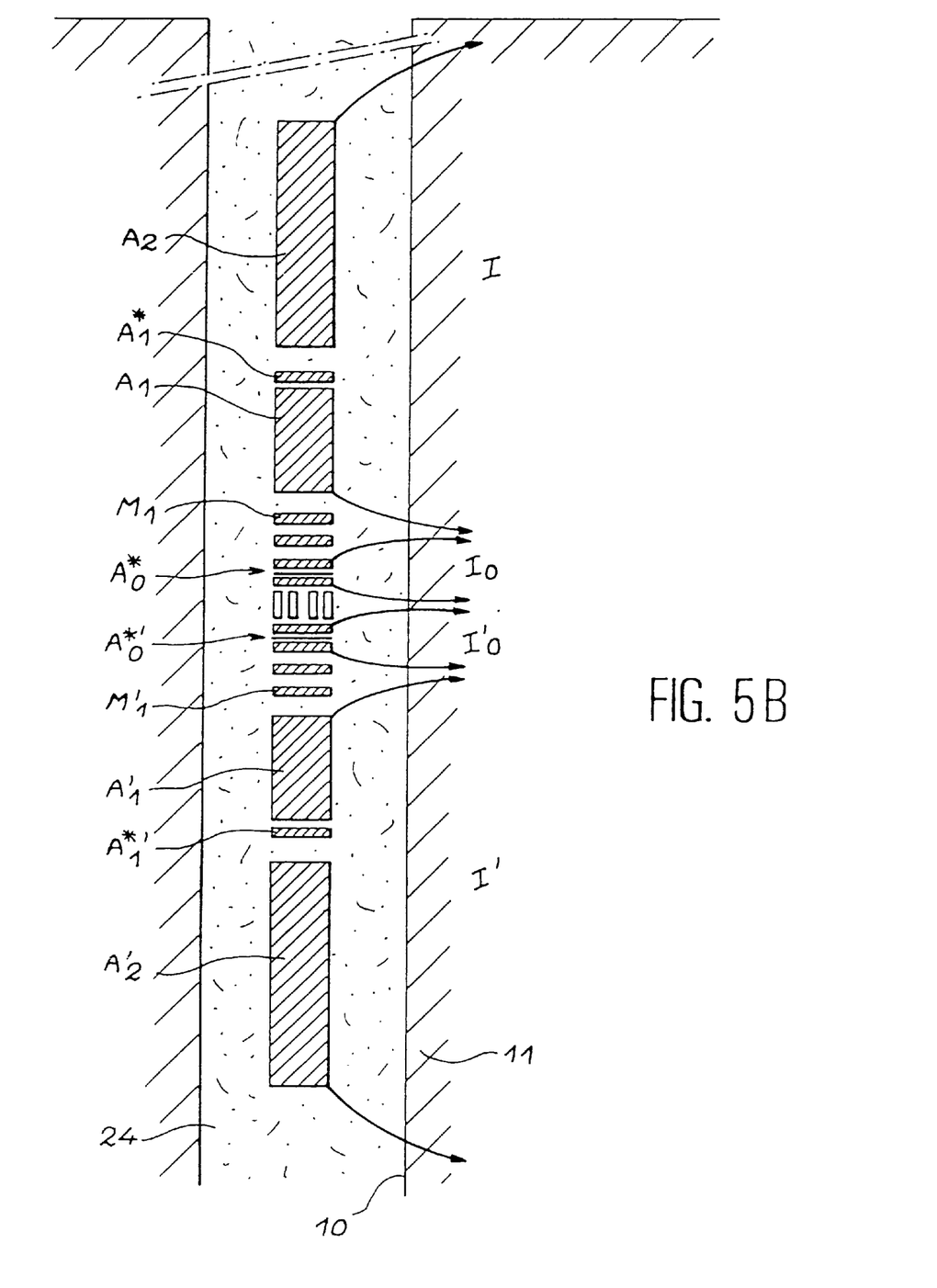

In the electrode structure shown in FIGS. 5A and 5B, the focusing voltage is the voltage VlI-VZ and the sonde voltage is equal to $V_1-V_0^*$.

The first computation technique is now described in greater detail. For each mode, the investigation current is written $I_0$, the sonde voltage $\Delta V_m$, and the focusing voltage $\Delta V_m$.

The notation $I_{0,i}$, $\Delta V_{0,i}$, $\Delta V_{m,i}$ is used for the corresponding quantities in mode No. i (i=1, 2 or d, where d is the index for computed mode, with the mode i being described by the following column vector:

$$\begin{pmatrix} \Delta V_{0,i} \\ \Delta V_{m,i} \\ I_{0,i} \end{pmatrix}$$

The computed focusing condition is written: $\Delta V_{m,d}=0$, and the weighting of the two modes is designated by the coefficient $\lambda$. It is therefore necessary to find $\lambda$ such that:

$$\lambda \begin{pmatrix} \Delta V_{0,i} \\ \Delta V_{m,i} \\ I_{0,i} \end{pmatrix} + \begin{pmatrix} \Delta V_{0,2} \\ \Delta V_{m,2} \\ I_{0,2} \end{pmatrix} = \begin{pmatrix} \Delta V_{0,d} \\ 0 \\ I_{0,d} \end{pmatrix}$$

This equality is satisfied for:

$$\lambda = \frac{\Delta V_{m,2}}{\Delta V_{m,1}}$$

from which it can be deduced:

$$\Delta V_{0,d} = -\left(\frac{\Delta V_{m,2}}{\Delta V_{m,1}}\right)\Delta V_{0,1} + \Delta V_{0,2}$$

and $$I_{0,d} = -\left(\frac{\Delta V_{m,2}}{\Delta V_{m,1}}\right)I_{0,1} + I_{0,2} = I_{0,2}$$

With the resistivity of the mud being deduced therefrom as follows:

$$R_m = \left(\frac{\Delta V_{0,d}}{I_{0,d}}\right)K'' = K'' \times \frac{\Delta V0, 2 - \left(\Delta V0, 1 \frac{\Delta V_{m,2}}{\Delta V_{m,1}}\right)}{I_{0,2}}$$

where K" is a coefficient which depends on the geometrical characteristics of the sonde.

The data obtained on the voltages and the currents from the effective modes may be measured and then stored, for example. The coefficient $\lambda$ and the resistivity of the mud are computed subsequently, e.g. by means of a known type of computer that is specially programmed to perform this type of computation. By way of example, the computer may be contained in the surface unit 16 (see FIG. 1).

In another computation technique, a matrix A is initially computed enabling the vectors V and I to be associated by the relationship:

V=A.I where $$V = \begin{pmatrix} \Delta V_m \\ \Delta V_0 \end{pmatrix}$$

and $$I = \begin{pmatrix} I_0 \\ I_t \end{pmatrix}$$

A is a 2'2 matrix whose coefficients are written as follows:

$$A = \begin{pmatrix} a & b \\ d & e \end{pmatrix}$$

From the two effective modes, the following four equations are thus obtained:

$\Delta V_{m,1} = b I_{t,1}$ $\Delta V_{0,1} = e I_{t,1}$ $\Delta V_{m,2} = a I_{0,2}$ $\Delta V_{0,2} = d I_{0,2}$ from which it is possible to deduce the four coefficients or transfer impedances a, b, c, e.

The condition for focusing is written: $\Delta V_{m,d}=0$. It therefore suffices to find voltages $\Delta V_0$ and currents $I_0$ which satisfy:

$$\begin{pmatrix} 0 \\ \Delta V_{0,d} \end{pmatrix} = \begin{pmatrix} a & b \\ d & e \end{pmatrix} \begin{pmatrix} I_0 \\ I_t \end{pmatrix} = A \begin{pmatrix} I_0 \\ I_t \end{pmatrix}$$

The resistivity of the mud is deduced therefrom as follows:

$R_m = K''.(\Delta V_{0,d}/I_{0,d}) = K''(d-e(a/b))$

By replacing the transfer impedances by the values obtained from the voltages and the currents measured in the effective modes, the same expression is obtained as in the first equality given above for $R_m$.

This technique requires the measured values of the currents and of the voltages for the effective modes to be stored, after which a step of computing the transfer impedances is performed. The computation may be performed by a computer of known type, programmed appropriately for performing this type of computation.

Figure 8:
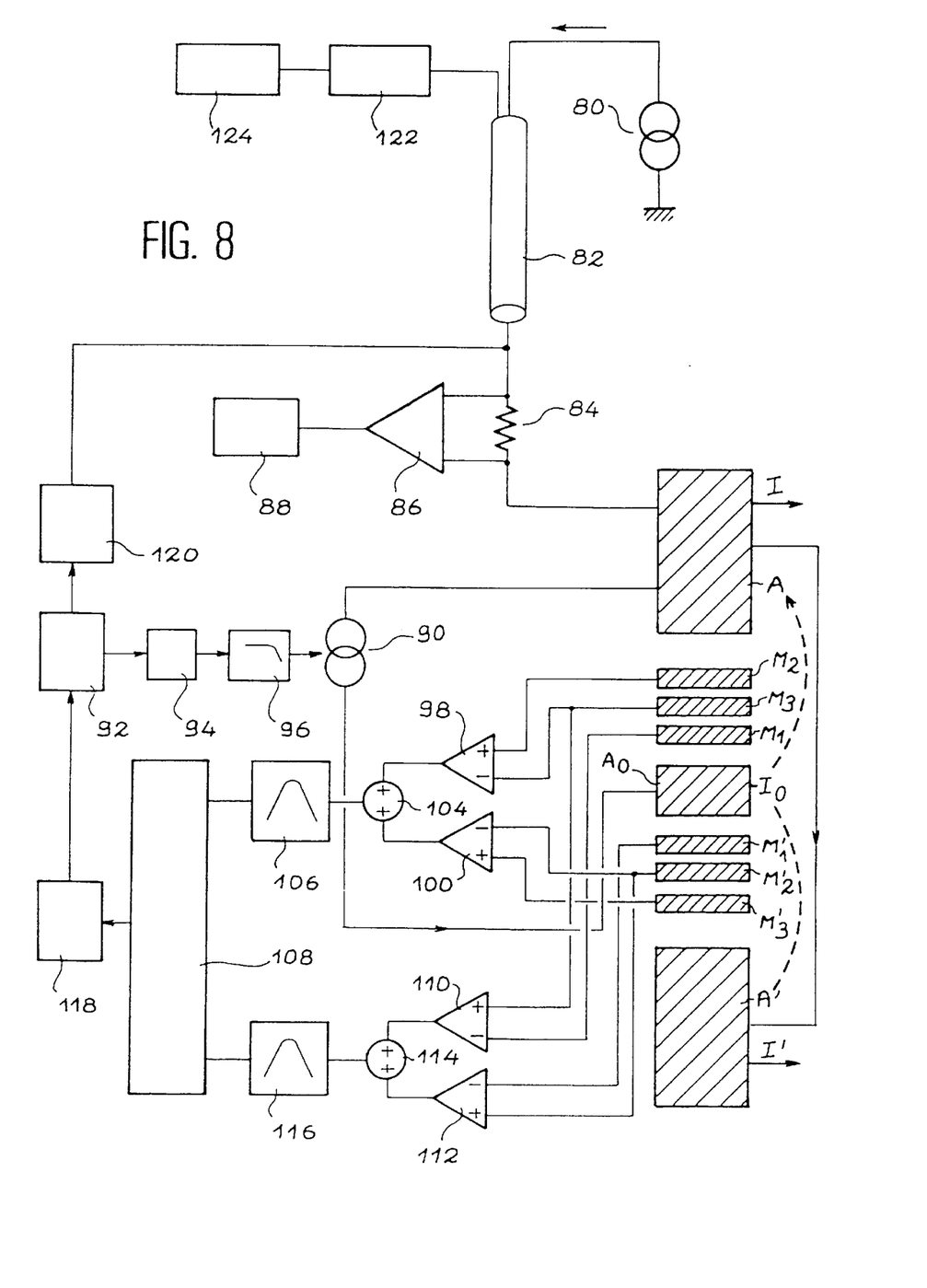
FIG. 8 is an electronic circuit diagram for implementing a method of the present invention that makes use of computed focusing.

FIG. 8 is an electrical circuit for use in a sonde in the context of a method of the invention for measuring mud resistivity by computed focusing. The electrode structure concerned is that described above with reference to FIG. 2A. A current source 80, e.g. situated at the surface, delivers a total current $I_t$ for enabling the sonde to operate in the first effective mode. This current is delivered via a cable 82. Means are provided (resistor 84, amplifier 86, phase measuring circuit 88) for measuring the phase of the current $I_t$. The current $I_0$ (when operating in the second effective mode) is produced by a generator 90 driven by a digital processor 92, a digital-to-analog converter 94, and a lowpass filter 96.

The focusing voltage is obtained by means of differential amplifiers 98 and 100 that take the difference between and amplify the voltages from annular electrode pairs $M_2$, $M_3$ and $M'_2$, $M'_3$. The signals from the differential amplifiers are applied to a summing circuit 104 whose output signal is filtered (bandpass filter 106) and is then applied to a multiplexer 108. The signals for measuring the voltage of the sonde are formed by differential amplifiers 110 and 112 which amplify and take the difference between the voltages from electrode pairs $M_1$, $M_3$ and $M'_1$, $M'_3$. The resulting signals are applied to a summing circuit 114 whose output is then filtered (bandpass filter 116), which signal is subsequently applied to the multiplexer 108. The multiplexer is connected to an analog-to-digital converter 118 in turn connected to the digital processor 92. The signal is then applied to a transmitter 120. The apparatus also includes a receiver 122 and a computer 124.

In all cases, whatever the measurement technique used (direct focusing or computed focusing), the measured resistivity of the mud may be subject to three sources of error:

if the formation surrounding the borehole is very resistive, then the current $I_0$ (investigation current) is very low, so the measured signals are low and the signal/noise ratio decreases;

if a zone or bed in a formation is particularly conductive, then the investigation current travels in part towards said conductive zone even if it is not situated facing the current electrode(s); and in small diameter holes of low contrast, or when the sonde is highly eccentric within the hole, then the influence of the hole is also perceptible.

These effects can be corrected in real time, e.g. by a processing method relying on the use of an extended Kalman filter. This method consists in iteratively solving two equations, for each depth n at which a measurement is performed:

$hrmd(n) = f(rm(n), hlld(n), dh(n), ec(n)) + \epsilon(n)$ (1)

$rm(n) = rm(n-1) + \delta(n)$ (2)

The first equation (1) is the measurement equation at depth n, in which:

hrmd is the raw measurement obtained using the sonde of the resistivity of the mud;

f is the direct model of the measurement, expressed as a function:

of the measured resistivity of the formation hlld(n);

of the resistivity of the mud rm(n);

of the diameter of the hole, dh(n); and of the eccentricity of the sonde in the hole ec(n).

The function $\epsilon$ is a stochastic parameter or random variable representing noise in measurement and uncertainty for f.

The second equation (2) represents variation in mud resistivity with depth. $\delta(n)$ is a random variable taking account of the dynamics.

The variance of $\epsilon$ is evaluated and adjusted at each depth level as a function of the measurement variance. Thus, if there are highly resistive beds, then $\epsilon$ takes on very large values. This gives rise mathematically to greater weight being given to the second equation. In which case, the last good estimate rm of $R_m$ (or an extrapolation therefrom) is retained. The hole effect is modelled and corrected by the first equation.

At each depth n, f is computed and compared with the raw measurement hrmd.

Equations (1) and (2) are solved by finding the most probable value r̂m̂(n). Assuming that ϵ(n) and δ(n) are Gaussian, that amounts to maximizing a non-linear cost function that represents the weighed sum of reconstruction error [hrmd(n)−f(r̂m̂(n) . . . )]² and the a priori error [rm(n−1)−r̂m̂(n)]². The solution can be found by the Gauss-Newton method.

The correction method described above can be implemented by means of a conventional computer programmed in appropriate manner. The corrections may be performed on the surface close to the borehole, or remotely after the measurement data has been transferred.

Figure 9:
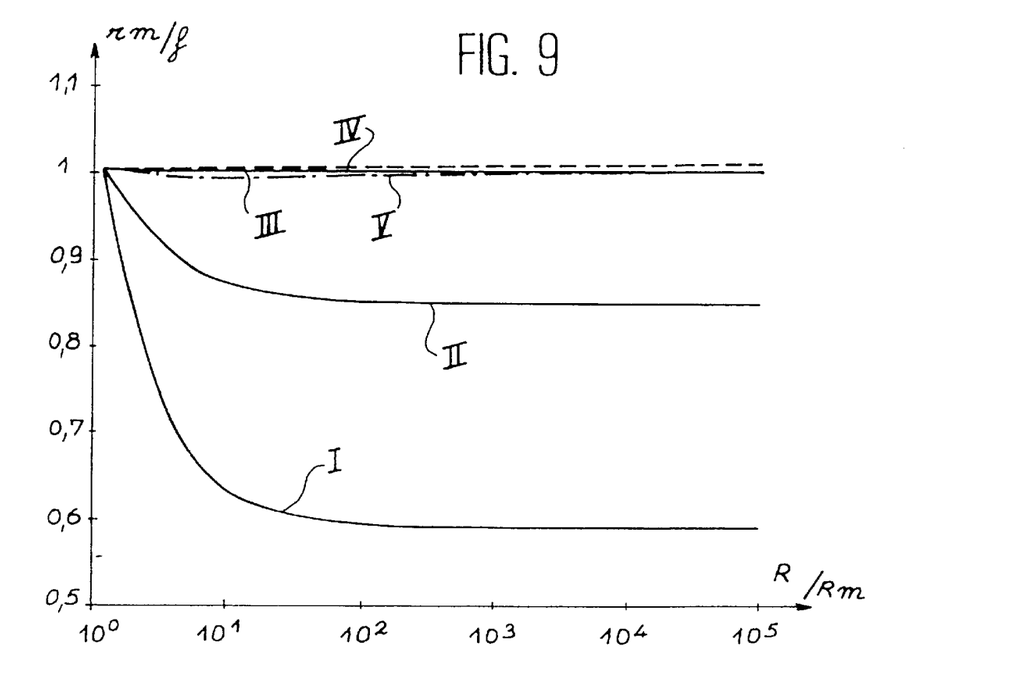
FIG. 9 shows the influence of the characteristics of the borehole on mud resistivity measurements performed in accordance with the invention.

The results obtained by finite element modelling of the response are illustrated in FIG. 9. This figure shows how the ratio rm/f (correction factor) varies as a function of $R_t/R_m$, i.e. as a function of the ratio of formation resistivity to mud resistivity, or in other words as a function of the contrast between the resistivity and the mud. Curve I is plotted for a hole diameter of 12.5 cm, curve II for a hole diameter of 15 cm, and substantially superposed curves III, IV, and V correspond to respective hole diameters of 20 cm, 30 cm, and 40 cm. Formation resistivity continues to have an influence in small diameter holes, e.g. an influence of about 15% when the hole diameter is about 15 cm. In holes of larger diameter, the influence of formation resistivity rapidly becomes very small and is negligible when the hole diameter is greater than 20 cm. The curves in FIG. 9 were obtained for a centered tool, i.e. eccentricity has no effect.

We claim:

1. A method of measuring the resistivity $R_m$ of a drilling mud inside a borehole (10) passing through a terrestrial formation (11), the method comprising:

inserting a sonde (12) into the borehole, the sonde having an elongate body (17) provided with at least one annular current electrode ($A_0$, $A'_0$) and at least two annular guard electrodes (A, A', $A_1$, $A'_1$, $A_2$, $A'_2$) situated on either side of the annular current electrode;

emitting at least one current $I_0$ into the surrounding formation from the annular current electrode;

focusing the current $I_0$ in the formation by emitting two currents $I_1$ and $I'_1$ from the annular guard electrodes situated on either side of the annular current electrode; and producing a signal in response to the emitted current $I_0$, which signal is representative of the resistivity $R_m$ of the drilling mud.

2. A method according to claim 1, in which annular potential-measuring electrodes ($M_1$1, $M'_1$, $M_2$, $M'_2$, $M_3$, $M'_3$, $A_0^*$, $A_0^{*'}$) enable a signal to be obtained that is representative of a focusing potential, the currents $I_1$ and $I'_1$ being adjusted as a function of said signal.

3. A method according to claim 1, in which a signal is produced that is representative of a voltage induced through the drilling mud by the current $I_0$.

4. A method according to claim 2, in which the sonde includes a single annular current electrode ($A_0$), together with first and second pairs of annular electrodes ($M_1$, $M'_1$; $M_2$, $M'_2$) for measuring focusing potential, each pair being disposed on either side of the current annular electrode, the currents $I_1$ and $I'_1$ being adjusted so that the mean potential $V_1$ from the first pair of annular electrodes is equal to the mean potential $V_2$ from the second pair of annular electrodes.

5. A method according to claim 3:

the sonde including an annular current electrode ($A_0$) and first and second pairs of annular electrodes ($M_1$, $M'_1$; $M_3$, $M'_3$) for measuring voltage in the drilling mud, each pair being disposed on either side of the annular current electrode;

the resistivity $R_m$ being deduced from the ratio $(V_1-V_3)/I_0$ where $V_1$ and $V_3$ are the mean potentials from the two pairs of electrodes for measuring voltage in the drilling mud.

6. A method according to claim 4, the sonde including an annular current electrode ($A_0$) and first and second pairs of annular electrodes ($M_1$, $M'_1$; $M_3$, $M'_3$) for measuring voltage in the drilling mud, each pair being disposed on either side of the annular current electrode;

the resistivity $R_m$ being deduced from the ratio $(V_1-V_3)/I_0$ where $V_1$ and $V_3$ are the mean potentials from the two pairs of electrodes for measuring voltage in the drilling mud; and a pair of electrodes for measuring focusing potential being identical to a pair of electrodes for measuring voltage in the drilling mud.

7. A method according to claim 1, the sonde including:

two annular current electrodes ($A_0$, $A'_0$) respectively emitting a current $I_0$ and a current $I'_0$ into the surrounding formation; and an annular electrode ($M_0$) situated between the two current electrodes, or an array of azimuth electrodes ($A_{azi}$) situated between the two annular current electrodes.

8. A method according to claim 7, in which annular potential-measuring electrodes ($M_1$, $M'_1$, $M_2$, $M'_2$, $M_3$, $M'_3$, $A_0^*$, $A_0^{*'}$) enable a signal to be obtained that is representative of a focusing potential, the currents $I_1$ and $I'_1$ being adjusted as a function of said signal;

the sonde including a pair of annular electrodes ($M_1$, $M_{-1}$) for measuring focusing potential disposed on either side of the two annular current electrodes; and the currents $I_1$ and $I'_1$ being adjusted in such a manner that the mean potential $V_1$ from the pair of electrodes for measuring focusing potential are equal either to the potential of the annular electrode ($M_0$) for measuring potential and situated between the current electrode, or else to the mean potential of the azimuth electrodes ($A_{azi}$).

9. A method according to claim 7, in which a signal is produced that is representative of a voltage induced through the drilling mud by the current $I_0$;

the sonde including first and second pairs of electrodes ($M_1$, $M'_1$; $M_3$, $M'_3$) for measuring voltage in the drilling mud, each pair being disposed on either side of the pair of annular current electrodes; and the resistivity $R_m$ being deduced from the ratio $(V_1-V_3)/(I_0+I'_0)$ where $V_1$ and $V_3$ represent the respective mean potentials from the two pairs of electrodes for measuring voltage in the drilling mud.

10. A method according to claim 8, in which a signal is produced that is representative of a voltage induced through the drilling mud by the current $I_0$;

the sonde including first and second pairs of electrodes ($M_1$, $M'_1$; $M_3$, $M'_3$) for measuring voltage in the drilling mud, each pair being disposed on either side of the pair of annular current electrodes;

the resistivity $R_m$ being deduced from the ratio $(V_1-V_3)/(I_0+I'_0)$ where $V_1$ and $V_3$ represent the respective mean potentials from the two pairs of electrodes for measuring voltage in the drilling mud; and the pair of electrodes for measuring focusing potential coinciding with one of the two pairs of electrodes for measuring voltage.

11. A method according to claim 7, in which a signal is produced that is representative of a voltage induced through the drilling mud by the current $I_0$;

the sonde including a pair of annular electrodes ($A_0^*$, $A_0^{*\prime}$) for measuring voltage in the drilling mud, each of the electrodes in this pair being disposed:

either between first and second portions of one of the annular current electrodes ($A_0$, $A'_0$);

or between one of the annular current electrodes ($A_0$, $A'_0$) and either the potential-measuring electrode ($M_0$) situated between the current electrodes, or the array of azimuth electrodes ($A_{azi}$);

the resistivity $R_m$ being deduced from the ratio $(V_0-V'_0)/(I_0+I'_0)$ where $V_0$ is the mean potential of the pair of annular electrodes for measuring voltage in the drilling mud and where $V'_0$ is:

either the potential of the electrode ($M_0$) for measuring potential and situated between the two current electrodes;

or else the mean potential of the azimuth electrodes ($A_{azi}$).

12. Apparatus for measuring the resistivity of drilling mud in a borehole (10) passing through a terrestrial formation (11), the apparatus comprising:

a sonde (12) having an elongate body (17) provided with at least one annular current electrode ($A_0$, $A'_0$) and at least two annular guard electrodes ($A$, $A'$, $A_1$, $A'_1$, $A_2$, $A'_2$) situated on either side of the annular current electrode;

means for emitting at least one current $I_0$ into the surrounding formation from the annular current electrode;

means for focusing the current $I_0$ in the formation by emitting two currents $I_1$ and $I'_1$ from the two annular guard electrodes situated on either side of the annular current electrode; and means for producing a signal in response to the emission of the current $I_0$, said signal being representative of the resistivity $R_m$ of the drilling mud.

13. Apparatus according to claim 12, further comprising:

means for producing a signal representative of a focusing potential; and means for adjusting $I_1$ and $I'_1$ as a function of said signal.

14. Apparatus according to claim 12, including means for producing a signal representative of a voltage induced through a drilling mud by the current $I_0$.

15. Apparatus according to claim 13, the sonde comprising:

a single annular current electrode ($A_0$) and first and second pairs of annular electrodes ($M_1$, $M'_1$; $M_2$, $M'_2$) for measuring focusing potential, each pair being disposed on either side of the annular current electrode; and means for adjusting $I_1$ and $I'_1$ as a function of the signal representative of a focusing potential enabling $I_1$ and $I'_1$ to be adjusted in such a manner that the mean potential $V_1$ of the first pair of electrodes is equal to the mean potential $V_2$ of the second pair of electrodes.

16. Apparatus according to claim 14, comprising:

a single annular current electrode ($A_0$) and first and second pairs of annular electrodes ($M_1$, $M'_1$; $M_3$, $M'_3$) for measuring voltage in the drilling mud, each pair being disposed on either side of the annular current electrode; and means for producing a signal representative of the resistivity $R_m$, enabling $R_m$ to be deduced from the ratio $(V_1-V_3)/(I_0)$ where $V_1$ and $V_3$ are the mean potentials from the two pairs of electrodes for measuring voltage in the drilling mud.

17. Apparatus according to claim 15, comprising:

a pair of electrodes for measuring focusing potential being identical to a pair of electrodes for measuring voltage in the drilling mud.

18. Apparatus according to claim 12, the sonde comprising:

two annular current electrodes ($A_0$, $A'_0$);

means for emitting into a surrounding formation a current $I_0$ via one of the annular electrodes, and a current $I'_0$ via the other annular electrode; and an annular electrode ($M_0$) for measuring potential, situated between the two current electrodes, or else an array of azimuth electrodes ($A_{azi}$) situated between the two annular current electrodes.

19. Apparatus according to claim 18, further comprising:

means for producing a signal representative of a focusing potential;

means for adjusting $I_1$ and $I'_1$ as a function of said signal;

the sonde including a pair of annular electrodes ($M_1$, $M'_1$) for measuring focusing potential disposed on either side of the two annular current electrodes; and the means for adjusting $I_1$ and $I'_1$ as a function of the signal representative of a focusing potential enabling $I_1$ and $I'_1$ to be adjusted in such a manner that the mean potential $V_1$ of the pair of electrodes for measuring the focusing potential is equal either to the potential of the annular electrode for measuring potential ($M_0$) situated between the current electrodes, or else to the mean potential of the azimuth electrodes ($A_{azi}$).

20. Apparatus according to claim 18, including means for producing a signal representative of a voltage induced through a drilling mud by the current $I_0$;

the sonde including first and second pairs of electrodes ($M_1$, $M'_1$; $M_3$, $M'_3$) for measuring tension in the drilling mud, each pair being disposed on either side of the pair of annular current electrodes; and the means for producing a signal representative of the resistivity $R_m$ enabling $R_m$ to be deduced from the ratio $(V_1-V_3)/(I_0+I'_0)$ where $V_1$ and $V_3$ respectively represent the mean potentials of the two pairs of electrodes for measuring voltage in the drilling mud.

21. Apparatus according to claim 19, including means for producing a signal representative of a voltage induced through a drilling mud by the current $I_0$;

the sonde including first and second pairs of electrodes ($M_1$, $M'_1$; $M_3$, $M'_3$) for measuring tension in the drilling mud, each pair being disposed on either side of the pair of annular current electrodes;

the means for producing a signal representative of the resistivity $R_m$ enabling $R_m$ to be deduced from the ratio $(V_1-V_3)/(I_0+I'_0)$ where $V_1$ and $V_3$ respectively represent the mean potentials of the two pairs of electrodes for measuring voltage in the drilling mud; and the pair of electrodes for measuring focusing potential coinciding with one of the two pairs of electrodes for measuring voltage.

22. Apparatus according to claim 18, including means for producing a signal representative of a voltage induced through a drilling mud by the current $I_0$;

the sonde including a pair of annular electrodes ($A_0^*$, $A_0^{*\prime}$) for measuring voltage in the drilling mud, each of the electrodes in said pair being disposed:

either between first and second portions of one of the annular current electrodes ($A_0$, $A'_0$);

or else between one of the annular current electrodes ($A_0$, $A'_0$) and either the electrode for measuring potential ($M_0$) situated between the current electrodes or else the array of azimuth electrodes ($A_{azi}$);

the means for producing a signal representative of the resistivity $R_m$ enabling $R_m$ to be deduced from the ratio $(V_0-V'_0)/(I_0+I'_0)$ where $V_0$ is the mean potential of the pair of annular electrodes for measuring voltage in the drilling mud and where $V'_0$ is:

either the potential of the electrode for measuring potential and situated between the two current electrodes;

or else the mean potential of the azimuth electrodes.

* * * * *